(12) United States Patent
Heien et al.

(10) Patent No.: US 11,005,326 B2
(45) Date of Patent: May 11, 2021

(54) ELECTRIC DRIVE UNIT HAVING COVER ASSEMBLY WITH INTEGRATED COOLING CHANNELS

(71) Applicant: GM GLOBAL TECHNOLOGY OPERATIONS LLC, Detroit, MI (US)

(72) Inventors: Stephen G. Heien, Lake Orion, MI (US); John A. Diemer, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 16/508,819

(22) Filed: Jul. 11, 2019

(65) Prior Publication Data

US 2021/0013764 A1 Jan. 14, 2021

(51) Int. Cl.
| | |
|---|---|
| *H02K 5/20* | (2006.01) |
| *H02K 9/19* | (2006.01) |
| *H02K 5/10* | (2006.01) |
| *B60L 15/00* | (2006.01) |
| *H02K 17/14* | (2006.01) |
| *H02K 9/00* | (2006.01) |

(52) U.S. Cl.
CPC .............. *H02K 5/10* (2013.01); *B60L 15/007* (2013.01); *H02K 9/00* (2013.01); *H02K 17/14* (2013.01)

(58) Field of Classification Search
CPC . H02K 5/10; H02K 17/14; H02K 9/00; B60L 15/00; B60L 15/007
See application file for complete search history.

(56) References Cited

U.S. PATENT DOCUMENTS

| | | | |
|---|---|---|---|
| 2013/0134807 A1* | 5/2013 | Murata | B60L 50/10 310/52 |
| 2013/0134840 A1* | 5/2013 | Murata | H02K 5/225 310/67 R |
| 2013/0140927 A1* | 6/2013 | Murata | E02F 9/0858 310/71 |
| 2013/0301220 A1* | 11/2013 | Hotta | H05K 7/20218 361/699 |

* cited by examiner

*Primary Examiner* — Naishadh N Desai
(74) *Attorney, Agent, or Firm* — Quinn IP Law

(57) ABSTRACT

An electric drive unit for powering a load, e.g., road wheels of a motor vehicle, includes a housing having a floor section separating the housing into upper and lower chambers. The floor section defines an elongated drain opening, drain holes, and an oil supply port in fluid communication with an oil pump. A rotary electric machine is enclosed within the lower chamber, and has electrical leads positioned directly below the drain opening. A cover assembly is fastened to the housing within the upper chamber, and has a coolant channel assembly integrally connected to a cover plate. The coolant channel assembly includes electrical terminals that project through the drain opening and are fastened at a first distal end of the electrical terminals to the electrical leads. The cover assembly defines a primary coolant channel in fluid communication with the oil supply port, and directs oil to the electrical terminals.

20 Claims, 6 Drawing Sheets

ELECTRIC DRIVE UNIT HAVING COVER ASSEMBLY WITH INTEGRATED COOLING CHANNELS

INTRODUCTION

Electric motors, generators, and combined motor/generator units are broadly referred to as rotary electric machines, and are used to produce torque for use in a wide variety of systems. For instance, the individual phase windings of a polyphase/alternating current (AC) traction motor for a powertrain may be energized via a power inverter module, which in turn is electrically connected to a multi-cell battery pack or other direct current (DC) power supply. Heat is generated during sustained operation of the AC motor, including the phase leads, stator windings, electrical terminals or connectors, and other electrically-conductive machine structure. As a result, thermal management systems are typically used to regulate temperature of a rotary electric machine.

High-voltage polyphase electric machines are commonly used in powertrain drive units. For instance, a motor vehicle having an electric drivetrain uses one or more traction motors as prime movers. The rotary electric machine in a vehicular powertrain application may be used as part of a drive unit disposed within a housing and coupled to a set of road wheels, possibly via a final drive unit. Motor torque from the energized electric machine is directed to the road wheels to propel the vehicle. In a regenerating mode, torque from the electric machine may be used to generate electricity. The generated electricity is then directed to the individual battery cells to recharge the battery pack, and/or used to power onboard electrical accessories.

Unlike a hybrid electric vehicle in which an internal combustion engine is used as a prime mover, a battery electric vehicle lacks the engine, and thus lacks an engine-driven oil pump for circulating oil to the electric machine. As a result, oil distribution for the purpose of cooling the electric machine may be suboptimal, particularly at low rotational speeds of the electric machine. For instance, a rotor of the rotary electric machine may rotate within an oil pool and/or a spray tube may be used to help distribute oil onto exposed surfaces of the electric machine at low rotational speeds.

SUMMARY

An electric drive unit is disclosed herein. The electric drive unit includes a multi-chamber housing, e.g., a cast metal drive unit case, with the housing defining upper and lower chambers separated from each other by a floor section. The electric drive unit also includes a rotary electric machine disposed within the lower chamber. The electric machine is cooled via oil that is deposited onto the electric machine through the floor section and a cover assembly. The cover assembly, which includes electrical terminals configured to connect to the electric machine, is configured to direct oil onto the electrical terminals for the purpose of cooling the electrical terminals.

Regarding the upper and lower chambers of the housing, the terms "upper" and "lower" have their customary relative meaning, i.e., the upper chamber is positioned above the lower chamber. In the disclosed configuration, gravitational forces cause oil that is present in the upper chamber to flow in a directed manner onto targeted surfaces of the electric machine within the lower chamber. The cover assembly is specifically configured to direct oil to the electrical terminals as noted above, with the drain holes of the floor section also directing some of the oil onto other exposed surfaces of the electric machine.

The upper chamber of the housing receives oil through an oil supply port, e.g., a circular orifice or opening defined by the housing. The oil supply port may be in fluid communication with an oil pump. For instance, the electric drive unit may be optionally used as part of a powertrain having a final drive unit, with a mechanical oil pump driven by a gear element of the final drive unit, e.g., a ring gear. In such an embodiment, for instance when the electric drive unit used as part of a battery electric vehicle powertrain, the oil pump circulates oil to the oil supply port. However, absent use of the cover assembly described herein, the distribution of oil to the electrical terminals of the cover assembly may be less than optimal, e.g., by possibly requiring the use of additional hardware such as spray tubes, electric oil pumps, or other associated hardware.

According to an exemplary embodiment, the cover assembly may include a cover plate and a coolant channel assembly that are integrally connected together, e.g., welded or heat-staked to form an integral unit. The coolant channel assembly, which has first and second ends, secures the electrical terminals of the cover assembly at the first end. The second end of the coolant channel assembly defines a fluid inlet in proximity to the oil supply port, with the fluid inlet being configured to admit oil from the oil supply port.

An elongated primary coolant channel is defined by the integrally-connected cover plate and coolant channel assembly. The primary coolant channel directs oil along the length of the coolant channel assembly and toward the electrical terminals. The oil passes from the primary coolant channel into direct wetted contact with the electrical terminals, e.g., via shorter secondary channels each terminating at a respective one of the electrical terminals. The oil flows around a perimeter surface of the electrical terminals before passing through a narrow gap defined between each of the electrical terminals and the surrounding structure of the coolant channel assembly. Upon passing through the gap, the oil flows evenly downward via gravity along an exposed outer surface of the electrical terminals, and in this manner cools the electrical terminals.

A particular embodiment of the electric drive unit includes a housing having a floor section separating the housing into an upper chamber and a lower chamber, with the floor section defining an elongated drain opening, a plurality of drain holes, and an oil supply port in fluid communication with an oil pump. The drive unit, which powers a load, further includes a rotary electric machine enclosed within the lower chamber, and having electrical leads positioned directly below the elongated drain opening.

Additionally, the drive unit in this embodiment includes a cover assembly fastened to the housing within the upper chamber, and having a coolant channel assembly integrally connected to a cover plate. The coolant channel assembly includes electrical terminals that project through the elongated drain opening, and that are fastened at a first distal end of the electrical terminals to the electrical leads of the electric machine. The cover assembly, which defines a primary coolant channel in fluid communication with the oil supply port, is configured to direct oil admitted through the oil supply port to the electrical terminals to thereby cool the electrical terminals.

The rotary electric machine may be embodied as a polyphase electric machine having three or more phase leads as the electrical leads. The load may be a set of road wheels of a motor vehicle.

The coolant channel assembly may be separated from the electrical terminals by an annular gap, with the cover assembly defining secondary coolant channels that collectively direct the oil from the primary coolant channel into the annular gap. The annular gap in some embodiments has a width of less than 0.5 millimeters.

Each of the electrical terminals includes an annular shoulder having a radially-outermost surface. The annular gap in such an embodiment extends between the radially-outermost surface and the coolant channel assembly.

A respective second distal end of each the electrical terminals may project through the cover plate and be connected to a power inverter connector block.

A cover assembly is also disclosed for the electric drive unit, with the cover assembly in an exemplary embodiment having a cover plate fastened to the housing within the upper chamber, and a coolant channel assembly integrally connected to the cover plate. The cover assembly includes electrical terminals configured, when the cover assembly is in an installed position with respect to the housing, to project through the elongated drain opening, and to be fastened to the electrical leads of the rotary electric machine at a first distal end of the electrical terminals. The cover assembly also defines an elongated primary coolant channel that, in the installed position, is in fluid communication with the oil supply port, such that the cover assembly is configured to direct oil admitted through the oil supply port to the electrical terminals and thereby cool the electrical terminals.

A motor vehicle is also disclosed herein. In a possible embodiment, the motor vehicle includes a high-voltage direct current (DC) battery pack, a power inverter module (PIM) connected to the high-voltage battery pack via a DC bus, an electric drive unit, and a set of road wheels. The electric drive unit includes the housing noted above, as well as a polyphase alternating current (AC) rotary electric machine connected to the PIM via a power inverter connector block, and connected to the road wheels. The rotary electric machine is enclosed within the lower chamber and has multiple phase leads positioned directly below the elongated drain opening. A cover assembly has a cover plate fastened to the housing within the upper chamber, and a coolant channel assembly integrally connected to the cover plate. The coolant channel assembly includes electrical terminals that project through the elongated drain opening and are fastened at a first distal end of the electrical terminals to the multiple phase leads of the rotary electric machine. The coolant channel assembly and the cover plate together define an elongated primary coolant channel in fluid communication with the oil supply port, such that the cover assembly is configured to direct oil admitted through the oil supply port to the electrical terminals to thereby cool the electrical terminals.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
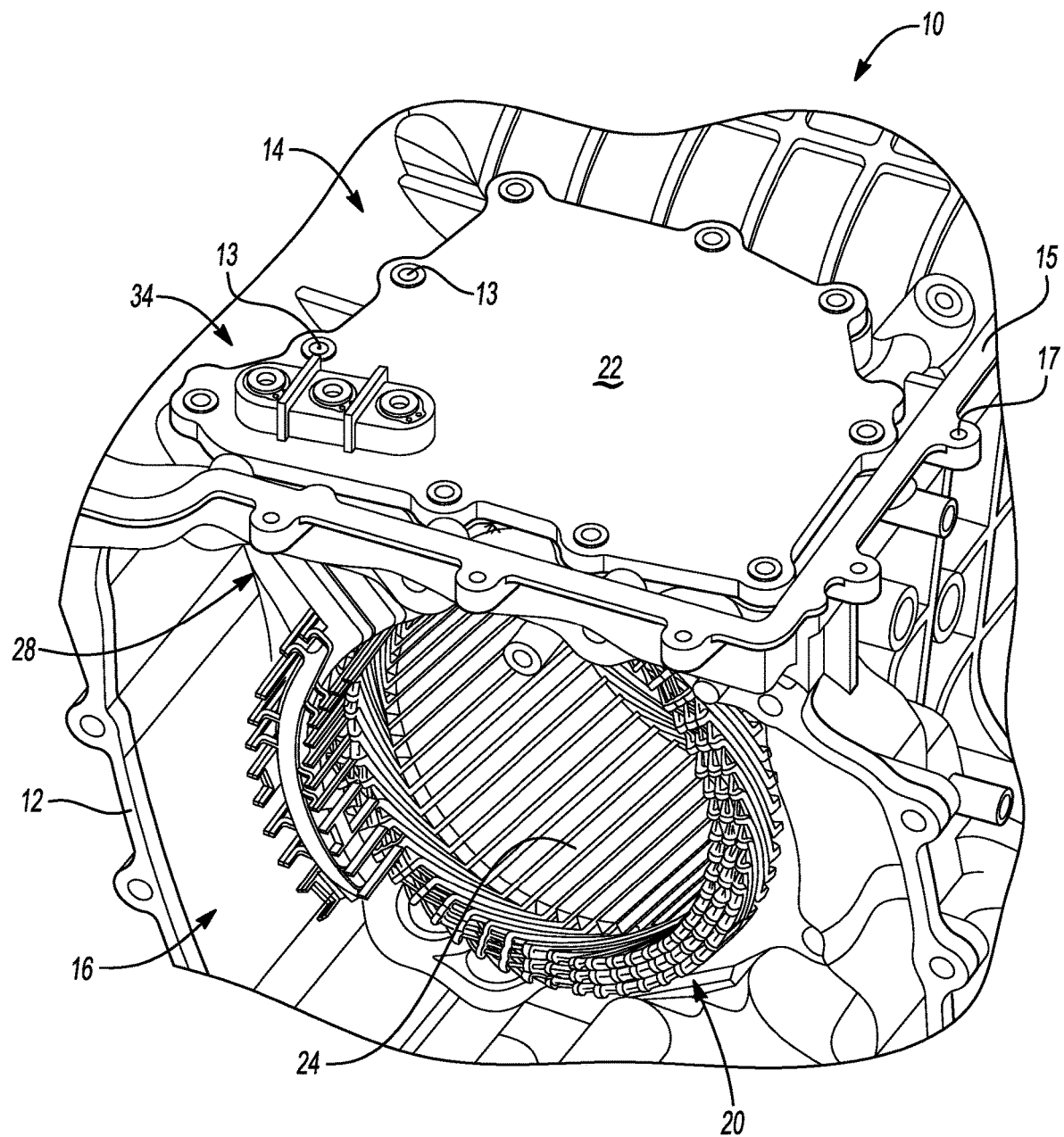
FIG. 1 is a schematic perspective view illustration of a portion of an electric drive unit having a housing equipped with a cover assembly as set forth herein.

The present disclosure is susceptible to various modifications and alternative forms, and some representative embodiments have been shown by way of example in the drawings and will be described in detail herein. It should be understood, however, that the inventive aspects of this disclosure are not limited to the particular forms disclosed. Rather, the disclosure is to cover all modifications, equivalents, combinations, sub-combinations, and alternatives falling within the spirit and scope of the disclosure as defined by the appended claims.

DETAILED DESCRIPTION

Referring to the drawings, wherein like reference numbers refer to like components throughout the several views, an electric drive unit 10 is shown in FIG. 1 having a housing 12 that forms a protective drive unit case. The electric drive unit 10 may be used in a host of beneficial applications, including but not limited to use as part of powertrain of a motor vehicle 80 described below with particular reference to FIG. 8. The housing 12 may be cast or otherwise formed to define separate upper and lower chambers 14 and 16, respectively, with an outer flange 15 defining periphery bolt holes 17. The electric drive unit 10 also includes an oil-cooled rotary electric machine 20, depicted in FIG. 1 as a polyphase/alternating current (AC) machine, which is disposed within the lower chamber 16 of the housing 12.

An outer cover (not shown) of the housing 12 shown in FIG. 1 may be bolted to the outer flange 15 via the periphery bolt holes 17 to thereby enclose the upper chamber 14. Within the upper chamber 14, a cover assembly 22 is attached to the housing 12 via fasteners 13 arranged around the periphery of the cover assembly 22. Once the cover assembly 22 is in the illustrated installed position, the cover assembly 22 forms an integral cooling manifold configured as described below with reference to FIGS. 4-7.

The electric machine 20 of FIG. 1 may be energized via a high-voltage battery pack 83 (see FIG. 8), e.g., a multi-cell battery pack having a relatively high voltage capability. As used herein, "high-voltage" may encompass voltage levels in excess of typical 12-15V auxiliary levels. In some embodiments, the electric machine 20 may be used as part of a powertrain assembly of the motor vehicle 80 of FIG. 8, e.g., a battery electric vehicle characterized by an absence of an internal combustion engine. In such an embodiment, DC voltage levels may approach or exceed 400V, for instance, and therefore sustained operation of the electric machine 20 may result in the generation of substantial amounts of heat. The electric machine 20 is therefore oil-cooled during its operation, with construction of the cover assembly 22 facilitating such the cooling function.

Figure 8:
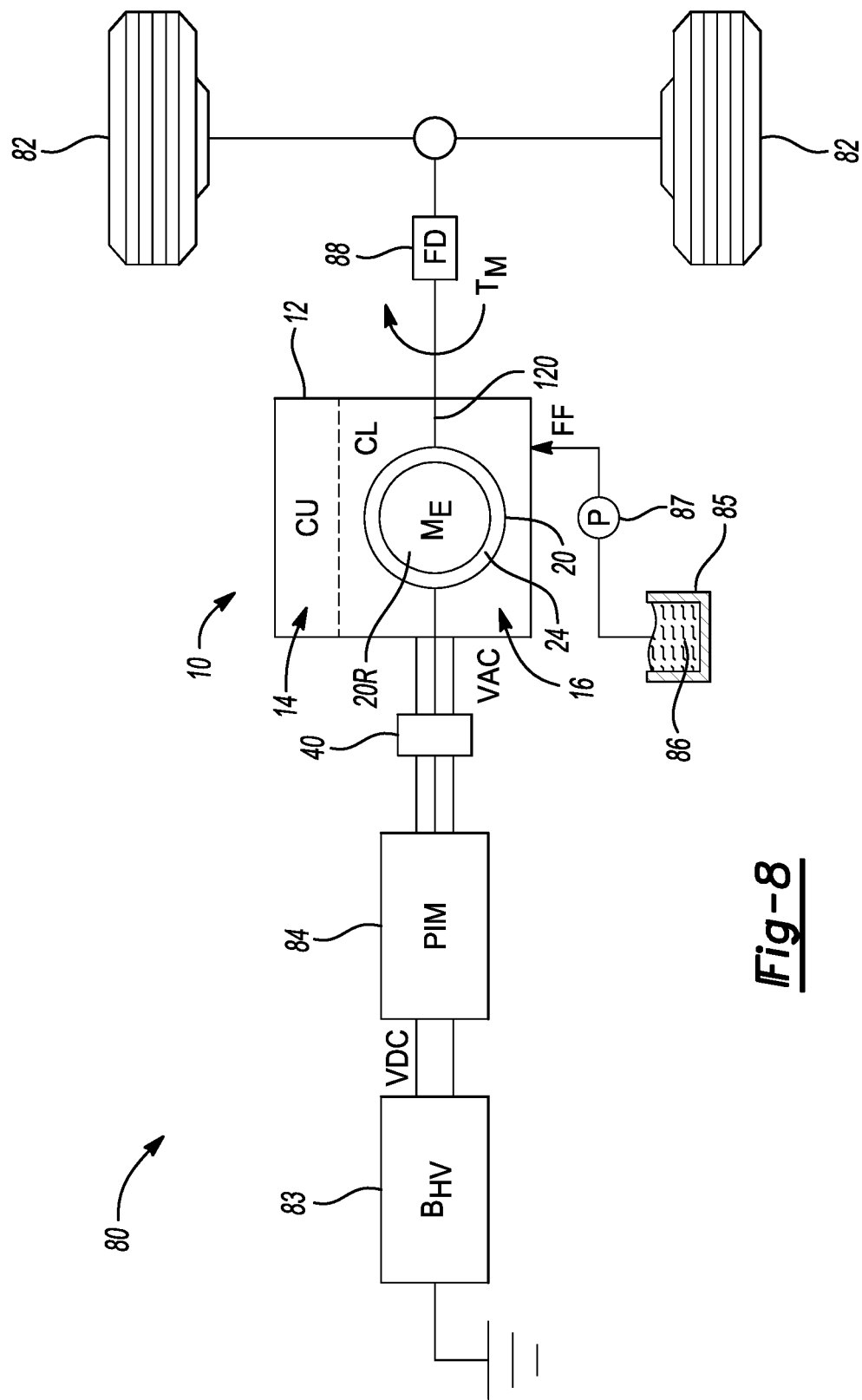
FIG. 8 is a schematic illustration of a motor vehicle that uses the electric drive unit assembly of FIG.

When the electric machine 20 of FIG. 1 is electrically energized by a power inverter module (PIM) 84, which as shown in FIG. 8 is connected to the above-noted battery pack 83, a rotor of the electric machine 20 (not shown in FIG. 1, but shown schematically at 20R in FIG. 8) disposed radially within a stator 24 of the electric machine 20 will rotate radially within the stator 24 within a pool of oil (not shown). Such rotation will tend to disperse some of the oil away from the rotor 20R onto surrounding structure of the electric machine 20. To enhance the cooling function, the cover assembly 22 is configured to deposit oil onto the electric machine 20 from above, and in particular to direct oil onto electrical terminals 34 of the of cover assembly 22 and electrical leads 28 of the electrical machine 20 connected thereto, with an exposed portion of the electrical terminals 34 depicted in FIG. 1 as protruding through the cover plate 22.

Figure 2:
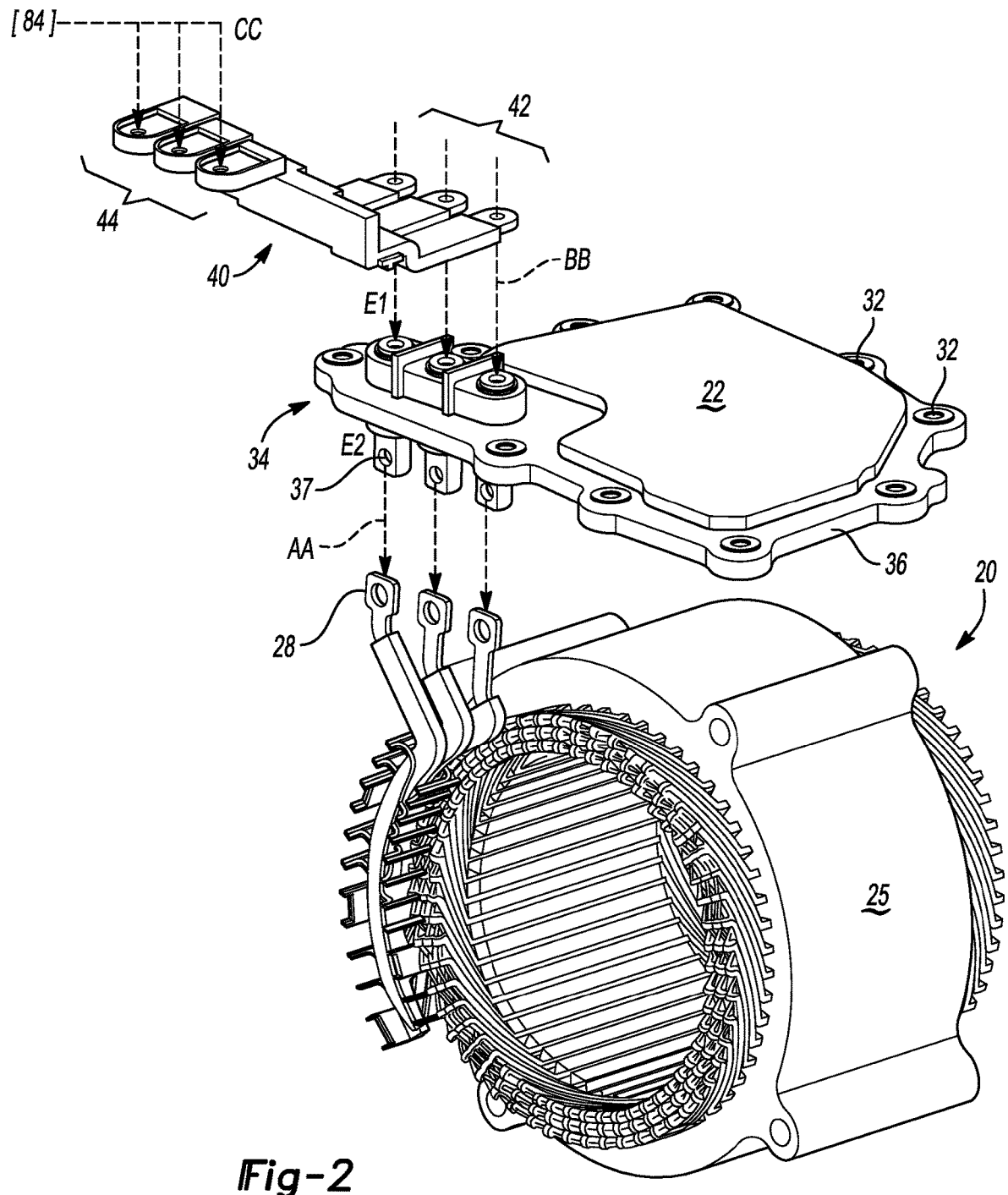
FIG. 2 is an exploded perspective view illustration of a rotary electric machine, cover assembly, and power inverter connector block for use with the electric drive unit shown in FIG. 1.

Referring to FIG. 2, the electric machine 20 in an exemplary polyphase embodiment includes a stator yoke 25 that is securely fastened within the lower chamber 16 of the housing 12 shown in FIG. 1. The cover assembly 22 is positioned within the upper cavity 14 of the housing 12 (FIG. 1) directly above the electric machine 20. The cover assembly 22 is secured to the housing 12, e.g., using bolts 13 (FIG. 1) inserted through mating bolt holes 32 defined adjacent to perimeter edge 36 of the cover assembly 22. The cover assembly 22 is oriented within the upper chamber 14 of FIG. 1 such that a respective first distal end E1 of each electrical terminal 34 is exposed within the upper chamber 14. An opposing second distal end E2 of the electrical terminals 34 is positioned adjacent to a respective one of the electrical leads 28 of the electric machine 20 as shown.

The electrical terminals 34 are then ultimately fastened to the electrical leads 28, e.g., ring-shaped lugs as shown, as indicated by arrows AA. The connection between the electrical terminals 34 and the electrical leads 28 may be achieved using suitable copper or other electrically-conductive fasteners (not shown). Within the upper chamber 14 of FIG. 1, a power inverter connector block 40 having flat connector lugs 42 and 44 may be used to electrically connect the power inverter connector block 40 to the PIM 84 of FIG. 8. That is, the connector lugs 42 may be fastened to the electrical terminals 34 at the first distal end E1, as indicated by arrows BB, and to the above-noted PIM 84, represented by "[84]" in FIG. 2, via the connector lugs 44 as indicated by arrows CC.

High-speed pulse-width modulation or other switching control of semiconductor switches residing within the PIM 84 of FIG. 8 is used to control powerflow to or from the electric machine 20 during motoring or generating operating modes, respectively. The power switching control process can rapidly heat the electric machine 20. Therefore, it is advantageous to cool the electrical terminals 34 and the connected electrical leads 28 with oil during operation of the electric machine 20. To this end, the cover assembly 22 as described herein is configured as an integral cooling manifold to facilitate delivery of oil to the electrical terminals 34 and the electrical leads 28, as will now be described with reference to FIGS. 3-8.

Figure 3:
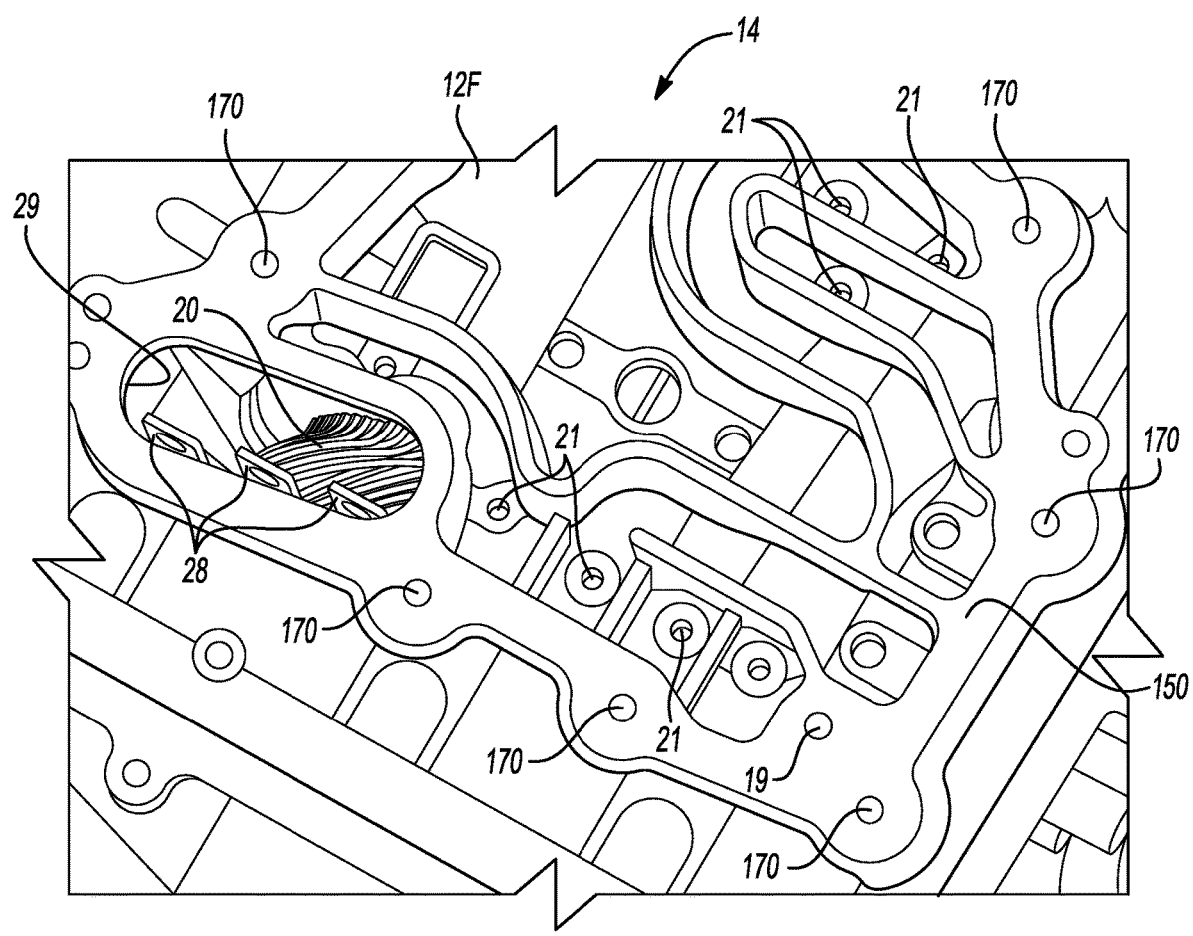
FIG. 3 is a schematic perspective view illustration of a portion of the drive unit housing depicted in FIG. 1.

Referring briefly to FIG. 3, the upper cavity 14 of the housing 12 depicted in FIG. 1 is shown with the cover assembly 22 removed for illustrative clarity. An inner flange 150 of the housing 12 provides a flat surface against which the cover assembly 22 seals when the cover assembly 22 is in the installed position of FIG. 1, possibly with the assistance of a sealing gasket. The inner flange 150 defines perimeter mounting holes 170 spaced around a periphery of the inner flange 150, with each of the mounting holes 170 receiving a respective fastener 13 (see FIG. 1) when the cover assembly 22 is attached to the inner flange 150.

The housing 12 of FIG. 1 also includes a floor section 12F that separates the housing 12 into the upper and lower chambers 14 and 16. That is, the floor section 12F forms a physical boundary between the upper and lower chambers 14 and 16, such that structure located above or below the floor section 12F is in the upper or lower chambers 14 or 16, respectively. The floor section 12F defines a plurality of drain holes 21 which allow oil to flow via gravity from the upper cavity 14 into the lower cavity 16 (FIG. 1). Thus, the floor section 12F may be angled, contoured, or otherwise configured to direct oil present in the upper chamber 14 toward and into the drain holes 21. Oil passing through the drain holes 21 is deposited onto targeted areas of the electric motor 20 located within the lower chamber 16.

The inner flange 150 further defines an elongated drain opening 29 located directly above the electric machine 20. The elongated drain opening 29 is at least co-extensive with the electrical leads 28, which along with a portion of the electric machine 20 are visible through the drain opening 29 from the perspective of FIG. 3. The area of the drain opening 29, e.g., an elongated racetrack-shaped, elliptical, or oval-shaped opening, is large enough to admit the electrical connectors 34 (FIG. 5) when the cover assembly 22 of FIGS. 2 and 3 is attached to the inner flange 150.

As noted above, the housing 12 of FIG. 1 defines a fluid passage that opens to an oil supply port 19. The oil supply port 19 admits oil into the cover assembly 22 of FIG. 2, with the admitted oil ultimately being directed through the cover assembly 22 and into the elongated drain opening 29, where the oil is gravity-fed onto and around the electrical terminals 34 shown in FIG. 2. Construction of the cover assembly 22 for the purpose of distributing oil in such a manner will now be described with reference to FIGS. 4-7.

Figure 4:
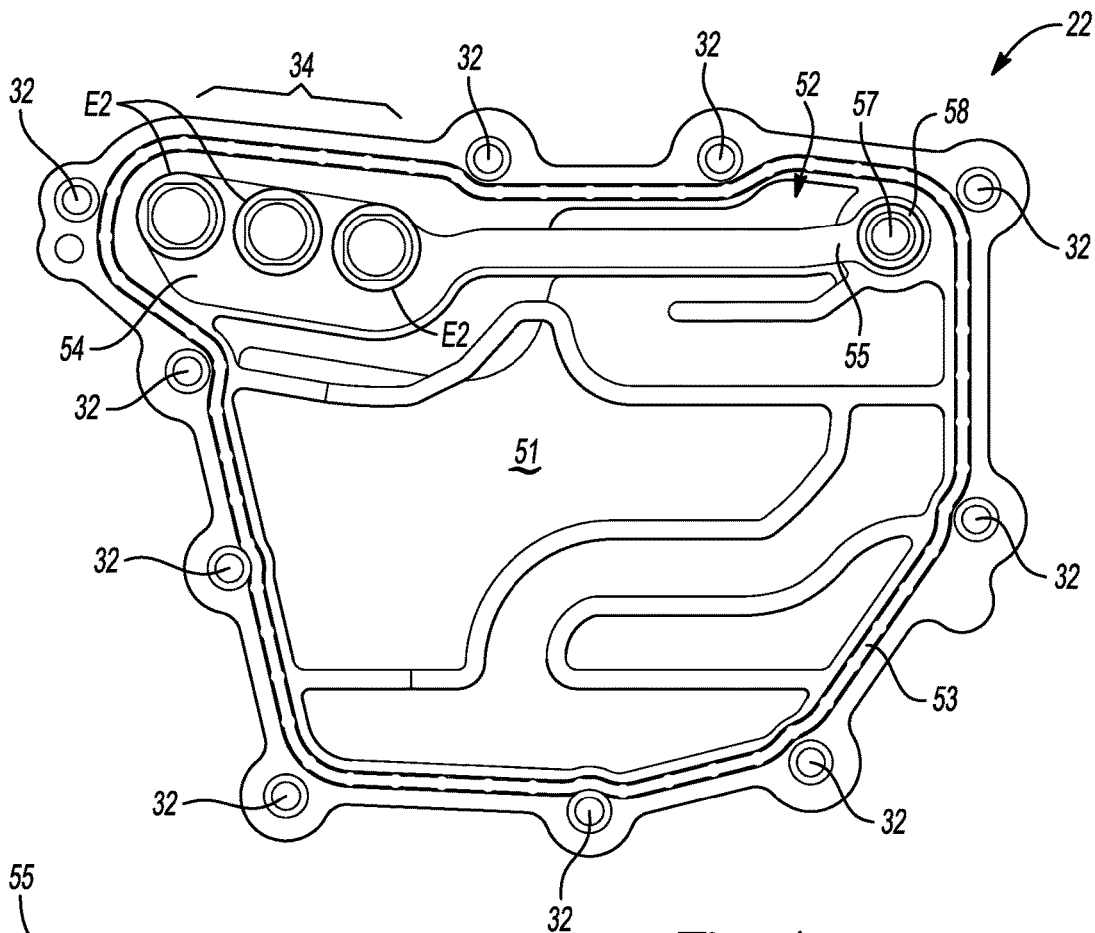
FIG. 4 is a plan view illustration of an underside of the cover assembly shown in FIGS. 1 and 2.

FIG. 4 depicts a bottom/inside view of the cover assembly 22, i.e., the side of the cover assembly 22 facing the floor section 12F of FIG. 3 when the cover assembly 22 is in the installed position. The cover assembly 22 includes a cover plate 51 constructed of molded plastic, aluminum, or another suitable lightweight material, with the perimeter bolt holes 32 distributed around the periphery of the cover plate 51. A fluid seal 53 may be contained within a periphery channel defined by the cover plate 51 to help seal the cover plate 51 against the inner flange 150 shown in FIG. 3. A coolant channel assembly 52, described below with reference to FIG. 5, may be welded or heat-staked to the cover plate 51 to form an integrated unit or assembly as shown.

The coolant channel assembly 52, in the depicted plan view, has a generally oar-shaped or paddle-shaped perimeter, i.e., a first end 54 having a larger surface area than an opposing second end 55. The above-noted second distal end E2 of each respective one of the electrical terminals 34 projects through the first end 54 of the coolant channel assembly 52, through the elongated drain opening 29 of FIG. 3, and toward the electric machine 20. The second end 55 of the coolant channel assembly 52 defines a fluid inlet 57, e.g., a circular opening as shown, which itself may be circumscribed by an O-ring 58 for additional fluid sealing integrity. Oil flowing from the oil supply port 19 of FIG. 3 and into coolant channel assembly 52 via the fluid inlet 57 ultimately passes along the length of the coolant channel assembly 52 to reach the first end 54, where the admitted oil flows around and past the electrical terminals 34 to cool the electrical terminals 34 and the electrical leads 28.

Figure 5:
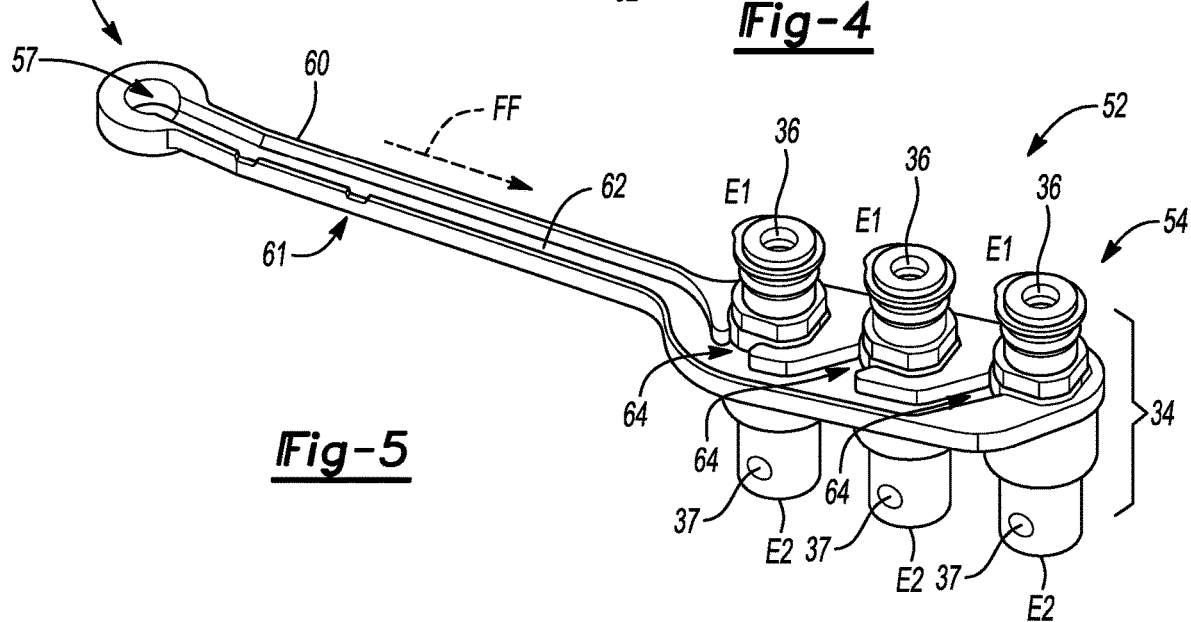
FIG. 5 is a schematic perspective view illustration of a coolant channel assembly usable as part of the cover assembly of FIG. 4.

Referring to FIG. 5, the electrical terminals 34 located at the first end 54 of the coolant channel assembly 52 are orientated as shown, i.e., with the first distal ends E1 orientated upward through the cover plate 51 of FIG. 4 and the opposing second distal ends E2 oriented downward toward the electric machine 20, as best shown in FIG. 2. To facilitate attachment of the electrical terminals 34 of FIG. 5 to the PIM 84 shown in FIG. 8 and to the electric machine 20 of FIGS. 1 and 2, the electrical terminals 34 may define respective upper and lower fastener openings 36 and 37.

The coolant channel assembly 52 has opposing upper and lower surfaces 60 and 61, respectively, with the upper surface 60 located immediately adjacent to the cover plate 51 shown in FIG. 4. The coolant channel assembly 52 defines the elongated primary channel 62. The primary channel 62 is in fluid communication with the fluid inlet 57 located at the second end 55 of the coolant channel assembly 52, as well as with the electrical terminals 34 located at the first end 54. Oil entering the fluid inlet 57 flows along the main channel 62 in the direction of arrow FF, i.e., toward the electrical terminals 34. The primary channel 62 may terminate in a plurality of secondary channels 64, e.g., three secondary channels 64 in the non-limiting example three-phase embodiment of the electrical machine 20. Each of the secondary channels 64 may be a short length of channel directing oil from the primary channel 62 to a respective one of the electrical terminals 34.

Figure 6:
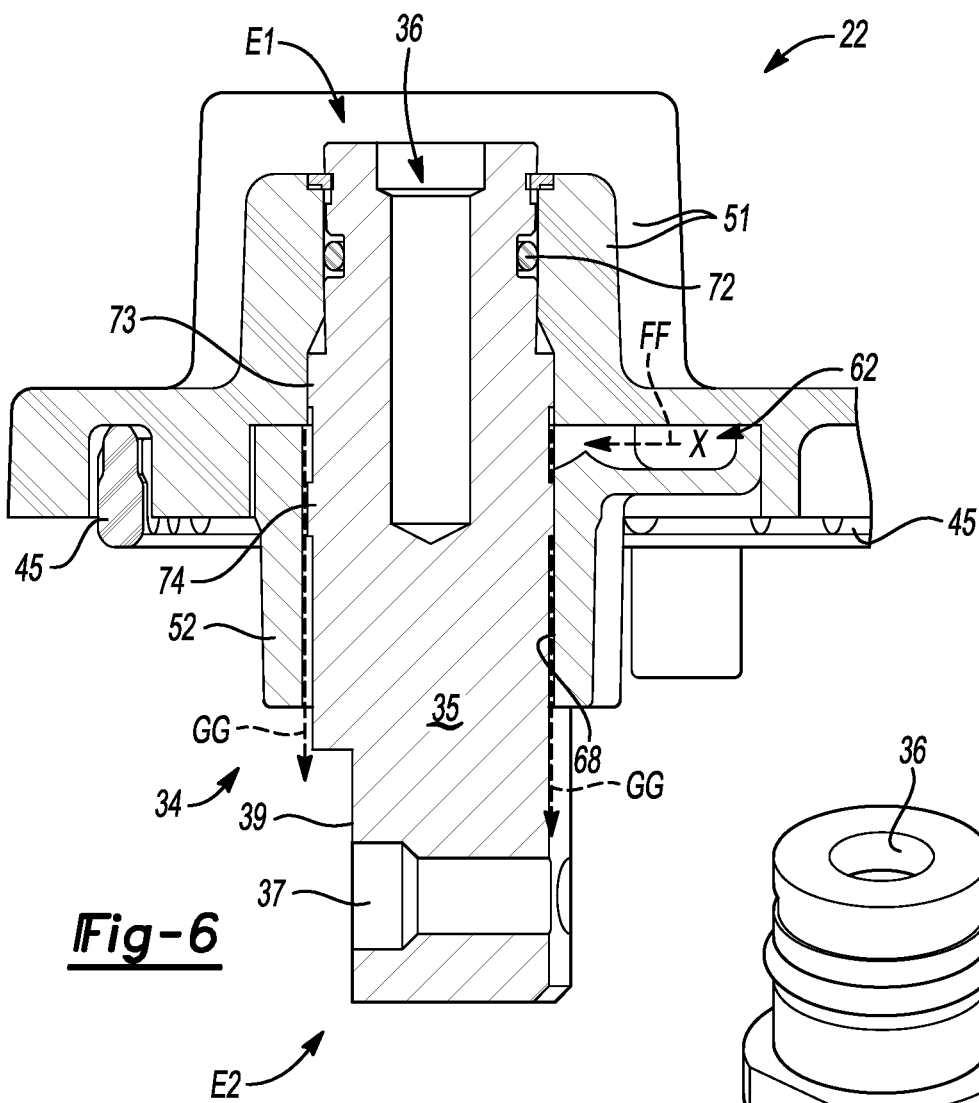
FIG. 6 is a cross-sectional view of a portion of the cover assembly of FIG. 4.

FIG. 6 depicts a portion of the cover assembly 22 as a cross-sectional view of a representative one of the electrical terminals 34 in an installed position. Fasteners such as threaded bolts or machine screws constructed of copper or another suitable electrically-conductive material, omitted for clarity, are inserted into the upper and lower fastener openings 36 and 37, respectively, to make the requisite electrical connections between the PIM 84 of FIG. 8 and the electric machine 20 shown in FIG. 1. A fastener inserted into the upper opening 36 secures a corresponding one of the connector lugs 42 of FIG. 2 to the electrical terminal 34, while a fastener inserted into the lower fastener opening 37 secures the electrical terminal 34 to a corresponding one of the electrical leads 28 (likewise shown in FIG. 2). In this manner, a conductive path is established between the PIM 84, the power inverter connector block 40 of FIG. 2, the electrical terminal 34, and a given electrical lead 28 of the electric machine 20.

Once the cover plate 51 is securely connected to the coolant channel assembly 52, the cover plate 51 encloses the primary channel 62. Oil flows in the main channel 62, i.e., into the page from the perspective of FIG. 6 as indicated by the "X", and toward a body 35 of the electrical terminal 34. A sealing gasket 45 may be positioned between the cover plate 51 and the housing 12 of FIGS. 1 and 3 to create a positive fluid seal along interfacing surfaces. Likewise, an O-ring 72 (also see FIG. 7) may circumscribe the electrical terminal 34 proximate the upper fastener opening 36 to create a positive fluid seal between the electrical terminal 34 and the cover plate 51 above the level of the main channel 62. In an exemplary embodiment, the body 35 of the electrical connector 34 is an elongated cylinder terminating in a flatted surface or land 39, with the lower fastener opening 37 formed through the land 39. Use of the land 39, which is flat, may facilitate connection to the electrical leads of FIG. 2 which are similarly flat, thereby enabling good conductive surface-to-surface contact.

Once the electrical terminal 34 is in the installed position depicted in FIG. 6, an inner wall 68 of the coolant channel assembly 52 is situated a short distance away from the body 35 of the electrical terminal 34. While the size of such a gap may vary with the application, the width of the gap should be minimal, e.g., about 0.20-0.30 millimeters (mm) in an exemplary embodiment, or less than 0.50 mm in another embodiment. Oil is thus permitted to flow along the coolant channel 62 in the direction of arrow FF and around the circumference of the body 35. The oil then passes through the narrow gap between the inner wall 68 and the body 35, whereupon gravity ensures that the oil passes downward in the direction of arrow GG along the length of the electrical terminal 34 to thereby cool the electrical connector 34. The directions of arrows FF and GG in FIG. 6 thus trace the general oil flow direction through the cover assembly 22 according to the present teachings. The electrical terminal 34 may be formed with upper and lower radial shoulders 73 and 74, respectively, in order to optimize oil distribution on the electrical terminal 34.

Figure 7:
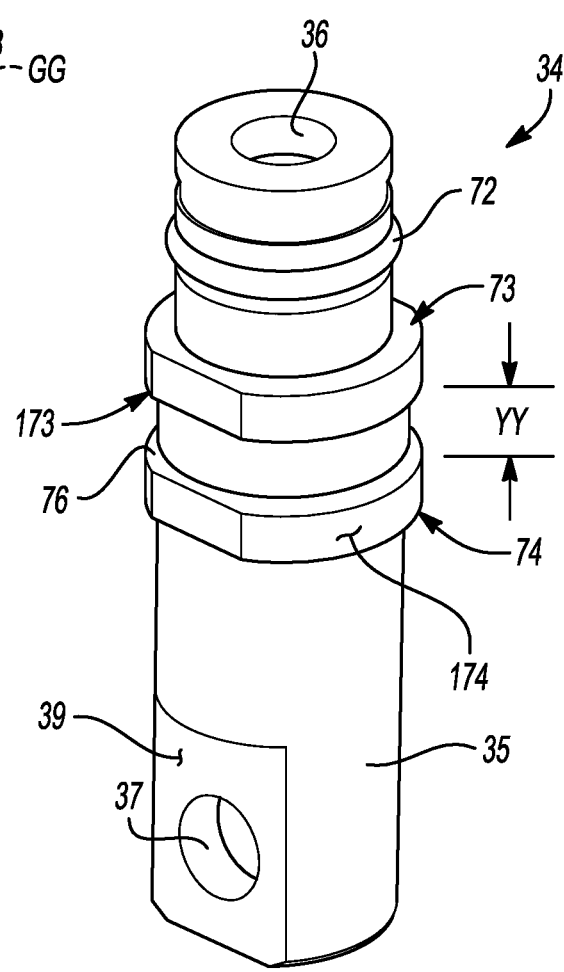
FIG. 7 is a schematic perspective view illustration of an electrical terminal usable as part of the cover assembly shown in FIG. 6.

Referring to FIG. 7, the electrical terminals 34 may be constructed in a manner that facilitates even distribution of oil received from the main channel 62 of FIG. 6. Under low-speed operation of the electric machine 20 or the motor vehicle 80 of FIG. 8, oil flowing in the primary channel 62 may not flow evenly along the circumference of the body 35. To address this potential problem, the upper and lower radial shoulders 73 and 74 may be formed as ring-shaped collars having an optional hex-head profile to facilitate installation, with the shoulders 73 and 74 separated from each other by an axial distance YY. An undersurface 173 of the upper radial shoulder 73 is immediately adjacent to the coolant channel assembly 52 as best shown in FIG. 5.

The lower shoulder 74 forms a shelf 76, which is horizontally-aligned when the electrical terminal 34 is in the illustrated vertical/installed orientation. A radially-outermost surface 174 of the lower shoulder 74 and the inner surface 68 of the coolant channel assembly 52 (FIG. 6) together define the above-noted narrow gap through which oil flows along the body 35 of the electrical terminal 34. Thus, viscosity of the oil supplied under low pressures, e.g., at low speeds of the electric machine 20 and/or the motor vehicle 80 of FIG. 8, will tend to cause the oil to adhere to and flow along the shelf 76 around the circumference of the body 35. The shelf 76 therefore acts as a reservoir by allowing a small amount of oil to pool under low-speed operation of the electric machine 20 when oil pressure levels are expected to be very low. Oil collected on the shelf 76 will eventually overflow, with gravity causing the overflowing oil to trickle evenly along the length of the body 35 and around the circumference of the body 35, thereby optimizing cooling of the electrical terminal 34 and connected electrical leads 28.

FIG. 8 schematically depicts the above-noted example motor vehicle 80. The motor vehicle 20 uses the electric drive unit 10 of FIG. 1 to generate and deliver motor torque (arrow $T_M$) to a coupled set of road wheels 82. The high-voltage battery pack ($B_{HV}$) 83 is electrically-connected to the PIM 84 via a high-voltage DC bus (VDC). The PIM 84 in turn is connected to the rotary electric machine 20, which is situated in the lower chamber (CL) 16 of the housing 12, via a high-voltage AC bus (VAC), possibly using the power inverter connector block 40 (also see FIG. 2).

An oil sump 85 contains a supply of oil 86, i.e., suitable coolant for use with the electric machine 20, that is circulated to the upper chamber (CU) 14 of the housing 12 via an oil pump (P) 87. In a possible embodiment, the motor vehicle 80 may include a final drive (FD) 88 connected to the rotor 20R of the electric machine 20 via a rotor shaft 120, with the final drive 88 embodied as one or more planetary gear sets. A ring gear or another suitable gear element of the final drive 88 may be connected to the oil pump 87 such that when the motor vehicle 85 is moving, the driven oil pump 87 circulates the oil 86 through the cover assembly 22 of FIG. 1, as indicated by arrow FF, to cool the electrical terminals 34 of FIG. 6 in the manner set forth above. Pumps driven by other rotating members of the electric drive unit 10 of FIG. 1 and/or connected thereto, or individually driven, may be used in other embodiments to circulate oil to the upper chamber 14.

Other beneficial applications may be envisioned for the schematically-depicted electric drive unit 10, including other vehicle applications such as rail vehicles, aircraft, or watercraft, as well as in mobile robots or platforms. Stationary applications may also be envisioned, including powerplants, mining or manufacturing hoists, etc., and therefore the embodiment of FIG. 8 is representative of the present teachings and non-limiting.

As will be appreciated by those of ordinary skill in the art in view of this disclosure, the cover assembly 22 described above with reference to FIGS. 1-8, with its integrated coolant channel assembly 52, may be used to direct oil to targeted locations, such as the electrical terminals 34 shown in FIG. 1. Such electrical terminals 34 may be integral with the structure of the cover assembly 22 described above, with internal fluid passages defined by the coolant channel assembly 52 and the cover plate 51 replacing typical spray tubes or other structure. These and other benefits will be readily appreciated by one of ordinary skill in the art in view of this disclosure.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An electric drive unit for powering a load, the electric drive unit comprising:
a housing having a floor section separating the housing into an upper chamber and a lower chamber, wherein the floor section defines an elongated drain opening, a plurality of drain holes, and an oil supply port in fluid communication with an oil pump;
a rotary electric machine enclosed within the lower chamber of the housing, and having electrical leads positioned directly below the elongated drain opening; and
a cover assembly fastened to the housing within the upper chamber, and having a coolant channel assembly integrally connected to a cover plate, wherein the coolant channel assembly includes electrical terminals that project through the elongated drain opening, and that are fastened at a first distal end of the electrical terminals to the electrical leads of the electric machine;
wherein the cover assembly defines a primary coolant channel in fluid communication with the oil supply port and is configured to direct oil admitted through the oil supply port to the electrical terminals to thereby cool the electrical terminals.

2. The electric drive unit of claim 1, wherein the rotary electric machine is a polyphase electric machine having three or more phase leads as the electrical leads.

3. The electric drive unit of claim 1, wherein the load is a set of road wheels of a motor vehicle.

4. The electric drive unit of claim 1, wherein the coolant channel assembly is separated from the electrical terminals by an annular gap, and the cover assembly defines a plurality of secondary coolant channels that collectively direct the oil from the primary coolant channel into the annular gap.

5. The electric drive unit of claim 4, wherein the annular gap has a width of less than 0.5 millimeters.

6. The electric drive unit of claim 4, wherein each of the electrical terminals includes an annular shoulder having a radially-outermost surface, and wherein the annular gap extends between the radially-outermost surface and the coolant channel assembly.

7. The electric drive unit of claim 1, further comprising: a power inverter connector block, wherein a respective second distal end of each of the electrical terminals projects through the cover plate and is connected to the power inverter connector block.

8. The electric drive unit of claim 1, wherein the cover plate and the coolant channel assembly are welded or heat-staked together to form an integral unit.

9. A cover assembly for an electric drive unit having a rotary electric machine disposed within a lower chamber of a multi-chamber housing, and having a floor section separating an upper chamber from the lower chamber, wherein the floor section defines an elongated drain opening, a plurality of drain holes, and an oil supply port in fluid communication with an oil supply, the cover assembly comprising:
a cover plate fastened to the housing within the upper chamber; and
a coolant channel assembly integrally connected to the cover plate, and including electrical terminals configured, when the cover assembly is in an installed position with respect to the housing, to project through the elongated drain opening, and to be fastened to electrical leads of the rotary electric machine at a first distal end of the electrical terminals;
wherein the cover assembly defines an elongated primary coolant channel that, in the installed position, is in fluid communication with the oil supply port, such that the cover assembly is configured to direct oil admitted through the oil supply port to the electrical terminals and thereby cool the electrical terminals.

10. The cover assembly of claim 9, wherein the rotary electric machine is a polyphase electric machine having multiple phase leads as the electrical leads.

11. The cover assembly of claim 10, wherein the polyphase electric machine is configured to connect to a power inverter module via a power inverter connector block having a plurality of connector lugs, wherein a respective second distal end of the electrical terminals projects through the cover plate and is configured to connect to the plurality of connector lugs.

12. The cover assembly of claim 9, wherein the coolant channel assembly is separated from the electrical terminals by an annular gap, and defines a plurality of secondary coolant channels in conjunction with the cover plate, wherein the secondary coolant channels direct the oil from the elongated primary coolant channel into the annular gap.

13. The cover assembly of claim 12, wherein a width of the annular gap is less than 0.5 millimeters.

14. The cover assembly of claim 12, wherein each of the electrical terminals includes an annular shoulder having a radially-outermost surface, and wherein the annular gap extends between the radially-outermost surface and the coolant channel assembly.

15. A motor vehicle comprising:
- a high-voltage direct current (DC) battery pack;
- a power inverter module (PIM) connected to the high-voltage battery pack via a DC bus;
- an electric drive unit comprising:
  - a housing having a floor section separating the housing into an upper chamber and a lower chamber, wherein the floor section defines an elongated coolant opening, a plurality of drain holes, and an oil supply port in fluid communication with an oil supply;
  - a polyphase alternating current (AC) rotary electric machine connected to the PIM via a power inverter connector block, wherein the rotary electric machine is enclosed within the lower chamber and has multiple phase leads positioned directly below the elongated coolant opening; and
  - a cover assembly having a cover plate fastened to the housing within the upper chamber, and a coolant channel assembly integrally connected to the cover plate, wherein the coolant channel assembly includes electrical terminals that project through the elongated coolant opening and are fastened at a first distal end of the electrical terminals to the multiple phase leads of the rotary electric machine;
  - wherein the coolant channel assembly and the cover plate together define an elongated primary coolant channel in fluid communication with the oil supply port, such that the cover assembly is configured to direct oil admitted through the oil supply port to the electrical terminals to thereby cool the electrical terminals; and
- a set of road wheels coupled to and driven by the rotary electric machine.

16. The motor vehicle of claim 15, wherein the motor vehicle includes a final drive unit and an oil pump, the oil pump is driven by the final drive unit, and the oil supply is the oil pump.

17. The motor vehicle of claim 15, wherein the channel assembly is separated from the electrical terminals by an annular gap and defines a plurality of secondary coolant channels conjunction with the cover plate, and wherein the plurality of secondary coolant channels directs the oil from the primary coolant channel into the annular gap.

18. The motor vehicle of claim 17, wherein a width of the annular gap is less than 0.5 millimeters.

19. The motor vehicle of claim 17, wherein each of the electrical terminals includes an annular shoulder having a radially-outermost surface, and the annular gap extends between the radially-outermost surface and the coolant channel assembly.

20. The motor vehicle of claim 15, wherein the power inverter connector block includes a plurality of connector lugs, and a respective second distal end of each the electrical terminals projects through the cover plate and is connected to a corresponding one of the connector lugs.

* * * * *